United States Patent

Schmid

[15] 3,689,100
[45] Sept. 5, 1972

[54] STEERING LINKAGE FOR MOTOR VEHICLES

[72] Inventor: Leopold F. Schmid, Pischekstrasse 49, 7000 Stuttgart-0, Germany

[22] Filed: March 30, 1970

[21] Appl. No.: 23,881

[30] Foreign Application Priority Data

April 1, 1969    Germany..........P 19 16 578.7

[52] U.S. Cl. ..............................280/95 R, 287/85 A
[51] Int. Cl. .............................................B62d 7/20
[58] Field of Search .....280/95, 96, 96.2; 287/87, 85, 287/90, 88; 267/20

[56] References Cited

UNITED STATES PATENTS

| | | | |
|---|---|---|---|
| 1,077,047 | 10/1913 | Dodds | 287/87 X |
| 2,291,161 | 7/1942 | Katcher | 287/90 |
| 1,851,670 | 3/1932 | Hait | 287/87 X |
| 2,305,795 | 12/1942 | Schieferstein | 280/96.2 |
| 2,838,330 | 6/1958 | Fidler | 280/95 X |
| 2,129,804 | 9/1938 | Wheat | 280/95 |

FOREIGN PATENTS OR APPLICATIONS

| | | | |
|---|---|---|---|
| 1,098,382 | 1/1961 | Germany | 287/90 |
| 766,141 | 1/1957 | Great Britain | 280/96 |

*Primary Examiner*—Kenneth H. Betts
*Attorney*—Walter Becker

[57] ABSTRACT

A steering linkage for motor vehicles, in which the tie bar has both ends thereof provided with hinge pins extending in axial direction of the tie bar while said hinge pin means include cup-shaped portions for journalling in the joint housing, each of said cup-shaped portions having an inner concave and an outer convex spherical surface.

1 Claim, 3 Drawing Figures

PATENTED SEP 5 1972 3,689,100

INVENTOR.
Leopold F. Schmid
BY
Walter Becker

STEERING LINKAGE FOR MOTOR VEHICLES

The present invention relates to a steering linkage for motor vehicles. A steering linkage for motor vehicles must, on one hand, have a high degree of strength because considerable forces act upon the steering linkage, and because a break of these structural elements could have catastrophic consequences. On the other hand, a steering linkage should be as light as possible because a part of its weight is not cushioned and there exists the general tendency to make non-cushioned masses of a motor vehicle as small as possible to avoid any dangerous vibrations.

It is an object of the present invention to provide a steering linkage in which the tie bar with regard to a certain force to be transferred will retain the same strength as heretofore known tie bars while being lighter and less expensive than heretofore known tie bars.

This object and other objects and advantages of the invention will appear more clearly from the following specification in connection with the accompanying drawing, in which.

The steering linkage according to the present invention is characterized primarily in that each of the two ends of the tie bar is provided with a hinge pin which extends in axial direction of the tie bar and which, in a manner known per se, is cup-shaped while being provided with a convex ball surface and a concave ball surface for journalling in the link housing. The tie bar together with the two cup-shaped hinge pins consist of a single piece and form a hollow body which is formed by a chipless deformation of a tube. The chipless deformation of the tube is preferably effected by means of profiled rollers which act upon the outer circumference of the tube, and is furthermore effected by means of upsetting heads axially acting upon the ends of the tube. The radial action of the profiled rollers upon the outer circumference of the tube and the axial action of the upsetting heads upon the ends of the tube is preferably effected simultaneously.

Figure 1:
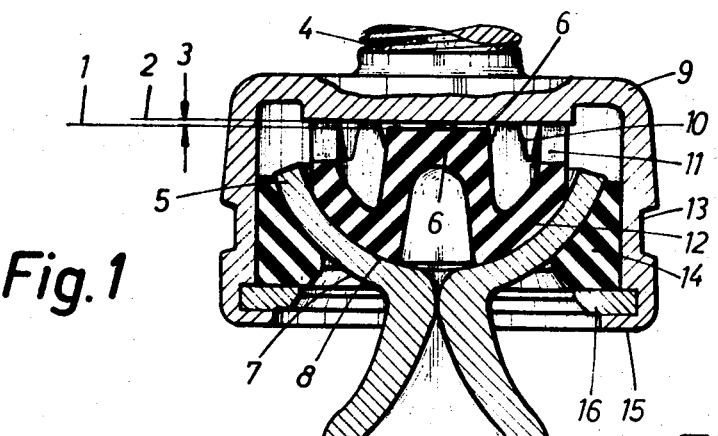
FIG. 1 illustrates on an enlarged scale a steering linkage according to the invention.
Figure 2:
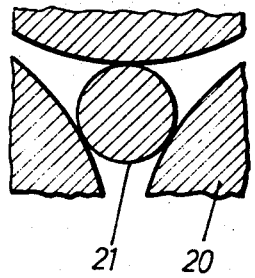
FIG. 2 is a cross-section through the hinge pin of the linkage according to FIG. 1 during a chipless deformation by profiled rollers.
Figure 3:
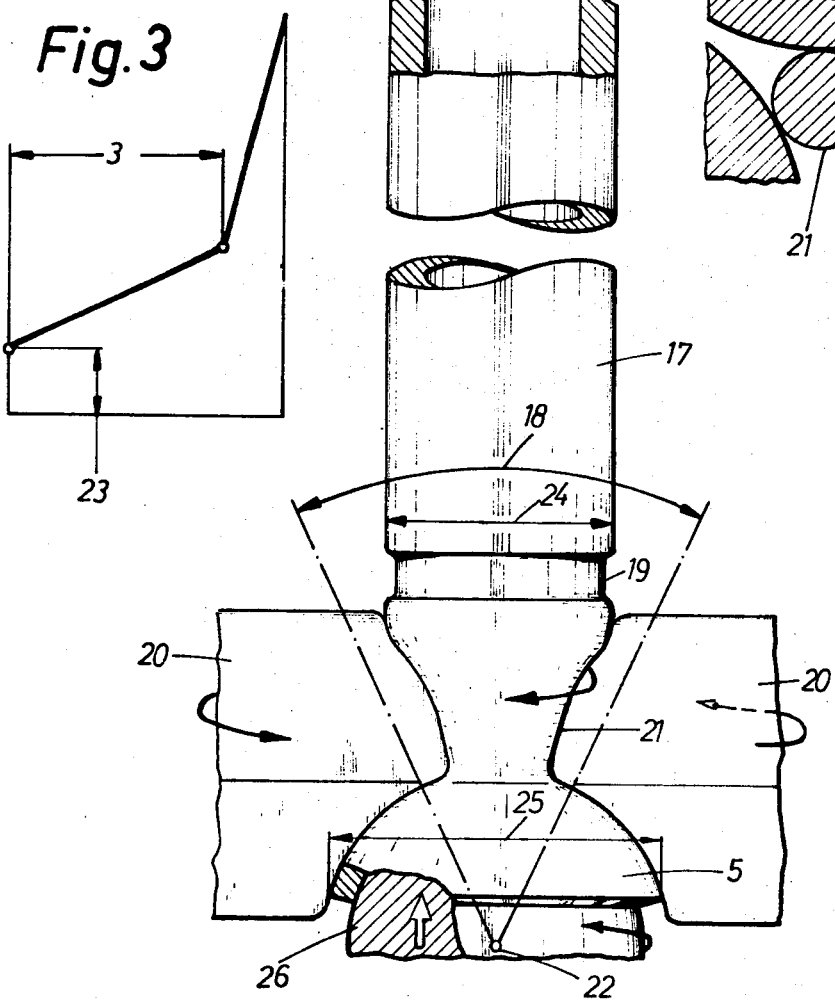
FIG. 3 is a force-stroke diagram of the inner bearing body for the play-free preloaded and yieldable mounting of the tie bar in the link housing.

Referring now to the drawing in detail, each end of the tie bar 17 has a hinge pin 5, 21 extending in axial direction of the tie bar 17 and having a cup shape while being provided with a convex ball surface 7 and a concave ball surface 8 for journalling in the joint housing 9. The housing 9 is provided with a threaded pin 4 by means of which the housing 9 is positively connected to the adjacent steering element (not shown) and is adjustable in the longitudinal direction of the tie bar 17. Such adjacent steering element may on one side of the tie bar be formed by the steering drive, for instance, the rack of a rack steering system and on the other side of the tie bar may be formed by the steering lever on the axle shank. The journalling of the hinge pin 5, 21 in the joint housing 9 is effected by means of the two bearing bodies 12, 14 which consist of an elastically deformable material, for instance, polyurethane. The inner bearing body 12 is provided with a plurality of spring means 10 in order to provide for a play-free preloaded and yieldable position of said body 12. According to a particularly advantageous embodiment of the invention, the spring means 10 are formed by tongs extending from a ring 11. Within this ring 11 there is provided an elastic abutment 6 which becomes effective whenever the axial load upon the tie bar is excessive The surface 1 of the abutment 6 is spaced from the supporting surface 2 of the joint housing 9 by a distance indicated by the reference numeral 3, and the spring means or tongs 10 are when the tie bar 17 is under no load preloaded to such an extent that a minimum supporting force 23 will result (see FIG. 3). The tie bar 17 together with the two cup-shaped hinge pins 5, 21 consist of a single piece and form a hollow body. This hollow body is produced by a chipless deformation of the tube 17 by mans of profiled rollers 20 which radially act upon the outer circumference of the tube 17 which has an outer diameter designated with the reference numeral 24, while upsetting heads 26 axially act upon the ends of the tube 17. When the outer diameter 25 of the cup-shaped hinge pin 5 is considerably greater than the outer diameter 24 of the tube 17, the ends of the tie bar are heated prior to the chipless deformation. The reference numeral 16 indicates a two-sectional disc which is fixedly connected to the joint housing 9 by rolling the ends 15 of the housing 9 around the periphery of the disc 16. The center of the joint is designated with the reference numeral 22, and the magnitude of the pivoting angle of the two joints is designated by the reference numeral 18. The groove 13 in the joint housing 9 and the groove 19 in the tie bar 17 serve for the connection of the not illustrated sealing sleeve which usually consists of rubber material.

As will be seen from the above, the steering linkage according to the present invention has the advantage that the particular design of the tie bar and its method of manufacture combine a maximum of strength with a minimum in weight and low costs for the manufacture. A further advantage is seen in the fact that with small dimensions of the joint housing, a large pivoting angle as well as a large bearing surface can be realized. The inner bearing body, due to the cup-shaped design of the hinge pin, can be dimensioned particularly large so that the pre-loaded play-free and yieldable journalling, even under the influence of high tie bar forces, will not succumb to fatigue and will, accordingly, have a long life.

It is, of course, to be understood that the present invention, is, by no means, limited to the particular construction shown in the drawing but also comprises any modifications within the scope of the appended claims.

What I claim is:

1. A steering linkage for motor vehicles, which includes: a tie bar, hinge pin means respectively connected to the ends of said tie bar and extending in the axial direction of said tie bar, each of said hinge pin means having an inner concave surface and an outer convex surface, housing means respectively housing said hinge pin means, and means arranged within said housing means and in sliding and supporting engagement with said concave and convex surfaces of said hinge pin mans, said tie bar together with said hinge pin means forming a single integral hollow body unit.

* * * * *